Nov. 6, 1962 K. WANDEL 3,062,129
MATERIAL FEEDING UNIT
Filed Aug. 16, 1960 3 Sheets-Sheet 1
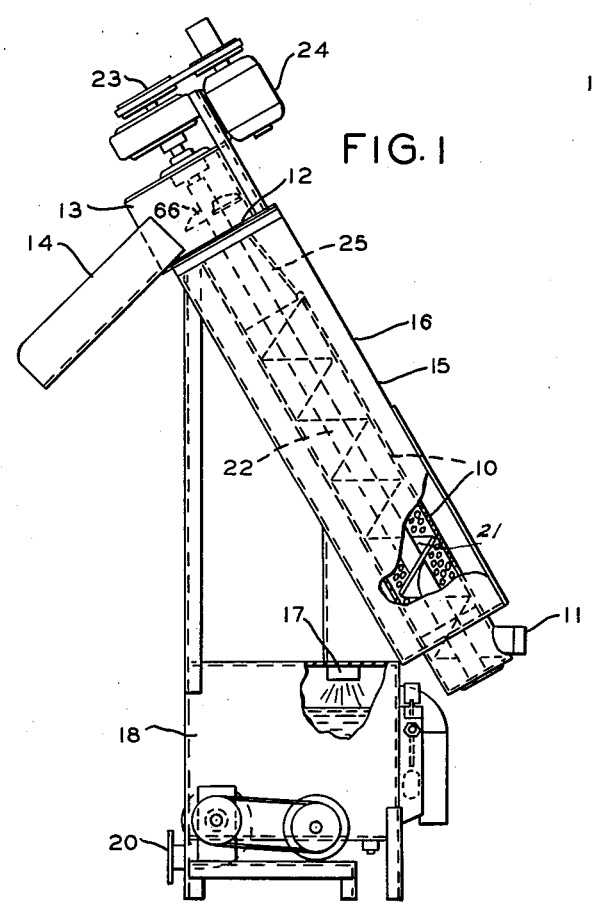
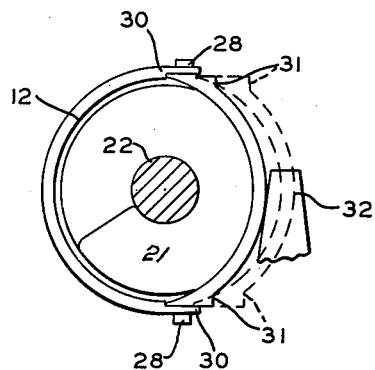
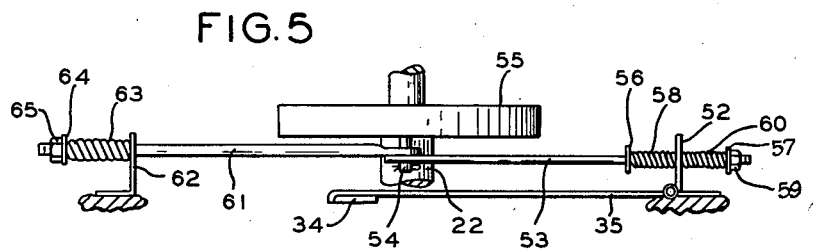
INVENTOR.
KURT WANDEL
BY Robert M. Ball
ATTORNEY

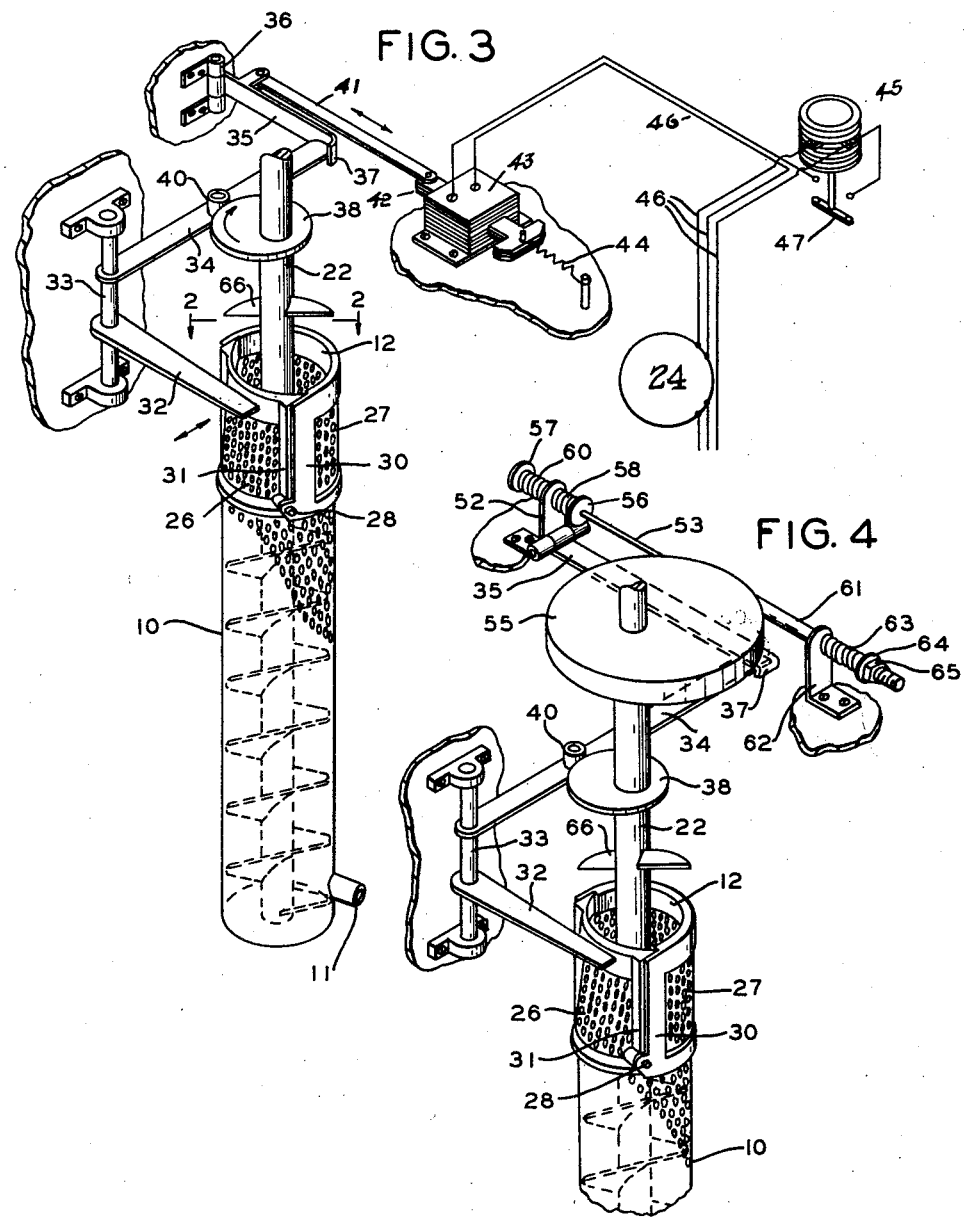

Nov. 6, 1962 K. WANDEL 3,062,129
MATERIAL FEEDING UNIT
Filed Aug. 16, 1960 3 Sheets-Sheet 3

INVENTOR.
KURT WANDEL
BY Robert M. Barr
ATTORNEY

United States Patent Office 3,062,129
Patented Nov. 6, 1962

3,062,129
MATERIAL FEEDING UNIT
Kurt Wandel, Downingtown, Pa.
Filed Aug. 16, 1960, Ser. No. 49,959
7 Claims. (Cl. 100—43)

The present invention relates to a mechanism for feeding saturated material and extracting the contained liquid, and more particularly to a control responsive to a variation in the density of a material being fed under pressure to, not only change the structure of the end product, but also to prevent overloading of the material feeding means.

Illustratively the invention can be incorporated in a dehydrating or extractor unit as a part of a waste disposal apparatus, shown as an example in applicant's pending patent application Ser. No. 417,729, filed March 22, 1954. Generally considered this apparatus concerns the treatment of material, such as paper, garbage, and all kinds of waste material ground in the presence of a percentage of water and reduced to a pulp-like consistency for delivery to an extractor for removing the contained water. The expected and desirable result is that of a uniform compacted substance with a minimum of moisture content for economical transportation or for further treatment.

The expected and desired end product has not heretofore been accomplished because elastic material such as pulp, organic material or the like being fed under pressure becomes intermittently packed so densely as to cause serious overloading of the conveyor driving means in its attempt to move such a compacted body.

An object of the invention is to provide a control for the feeding or extruding, under pressure, of pulp, such as ground wood, fruit or organic material so that it can be discharged uniformly without any densely compacted mass.

Another object is to provide a material feeding control, preferably operating in association with a waste disposal apparatus to produce an end substance which is light in weight, readily frangible and commercially useful for protecting articles being shipped or in other instances usable as a garden or lawn mulch.

A further object is to provide means operating during a dehydrating cycle to prevent the heretofore excessive packing of fed material while also eliminating reactive pressures which cause damaging overload on the driving motor.

A further object is to provide a control operating in association with the feeding of a saturated substance wherein means is responsive to an abnormal density of the substance and so restore normal density feeding conditions.

A still further object is to provide means for disintegrating the end product discharged from a dehydrating unit.

Another object will appear hereinafter.

In the accompanying drawings:

FIG. 1 is a side elevation view in part section of one form of extractor to which the invention is applied;

FIG. 2 is a section view on line 2—2 of FIG. 3;

FIG. 3 is a schematic view of the material feeding tube including one form of control responsive to overload conditions upon the feeding means;

FIG. 4 is a schematic view of the material feeding tube including another novel control responsive to overload conditions upon the feeding means;

FIG. 5 is a detail view of the torque rod control means;

Figure 6:
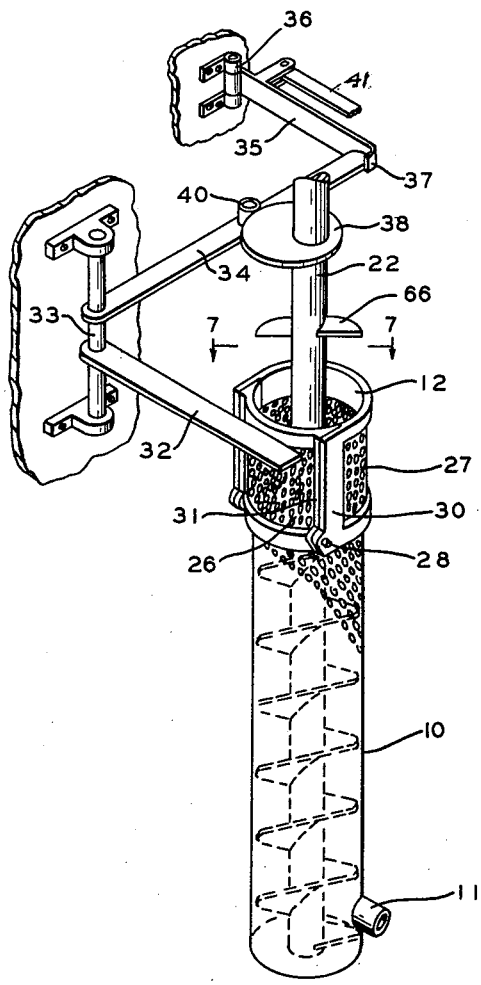
FIG. 6 is a fragmentary view showing a modified form of control as assembled for tubes having a uniform bore and wherein the packing takes place by the dragging friction of the material against the wall of the bore.
Figure 7:
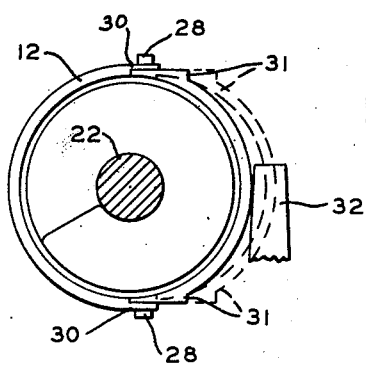

And FIG. 7 is a section view on line 7—7 of FIG. 6.

Referring to the drawings, an extractor for removing water from ground waste products is shown in FIG. 1 as one type of apparatus with which the invention is assembled to form a complete unitary machine. As shown, the extractor comprises a perforated cylinder 10, preferably upwardly inclined having an inlet 11 at its lower end to receive water saturated ground waste in the form of pulp from a suitable grinder. The upper end of the cylinder 10 has an outlet 12 which discharges into a hopper 13 to be delivered by a chute 14 to a collector or truck. The cylinder 10 is mounted coaxially within an outer shell 15 to form a space 16 encircling the cylinder 10 into which extracted water is received and discharged through an outlet 17 into a tank 18. An outlet 20 from the tank discharges the drained water for return to the grinder or into the sewer.

In order to feed the waste pulp through the cylinder 10, a conveyor screw 21 is journalled axially of the cylinder 10 on a shaft 22 which includes a reduction gear unit, a pulley 23 belt driven from an electric motor 24. The flights of the screw 21 rise helically about the driven shaft 22 and preferably terminate spaced from the discharge end of the cylinder 10 to leave a tubular space 25 for the reception of the saturated pulp. Actually, the pulp collects in this space to build up a dense plug body which subjects the driving motor to an undesirable overload. The present invention provides an effective control means for material being fed under pressure, such means being responsive to an increase in the density of the plug to relieve the created resistance and prevent motor overload while also intermittently acting to restore such density to normal for a predetermined feeding pressure.

Referring to FIG. 3, a selected length of the perforated cylinder 10 is formed by two lengthwise sections 26 and 27, each of semi-circular contour arranged for mating relation to form a continuation of the body of the cylinder. The arcuate section 26 is a cut-out portion of the cylinder 10 and is hinged, for movement towards and away from mating relation with the section 27 by means of two alined pivots 28 which respectively project into bearings of an open side frame 30 as an integral part of the perforated section 27. The section 26 is carried by an open frame 31 as a reinforcement as well as a mounting for the pivots 28. Thus the section 26 is arranged to swing on pivots 28 towards and away from the other half section 27 to provide a radially adjustable passage responsive to abnormal internal pressure due to compacting of the material. Preferably the section 26 is held tilted inwardly to form a restricted passage converging towards the outlet but is under control of a novel mechanism for shifting the section 26 outwardly to relieve an abnormal pressure by increasing the area of this passage.

This section control embodies either an electrical or a mechanical self-operating mechanism and both of which are responsive to an abnormal material driving torque.

Referring to FIG. 3, one form of electrical control comprises an arm 32 projecting radially from a suitably supported pivot shaft 33 which is operatively connected to a lever 34, the free end of which is arcuate and terminates in the path of a bell crank rock latch 35, mounted on a fixed pivot 36, to extend in a plane vertical to the plane of the lever 34 and terminating in an offset 37 normally overlying the free end of the lever 34. When so positioned the lever 34 maintains the arm 32 pressed against the section 26 to hold it in passage restricting position until the latch 35 is removed by pressure which creates an abnormal driving torque as will be explained presently.

In order to permit the section 26 to move outwardly under expansion of the compressed material, means are provided to swing the arm 32 away from the outwardly moving section 26, such means including a cam 38 keyed to the screw shaft 22 and riding against a cam follower 40 pivotally upstanding from the lever 34. As a result when the latch 35 has released the lever 34, the cam follower 40 rides to the low side of the cam 38 to thereby permit the section 26 to enlarge the formally restricted area and relieve the packing pressure. When the follower rides to the high cam side, the arm 32 restores the section 26 to its restricted position.

For the purpose of releasing the latch in response to abnormal driving torque, a link 41 is pivotally connected at one end to the bell crank or latch 35 and is pivotally connected at its other end to the plunger 42 of a solenoid 43. A tension spring 44 normally holds the plunger 42 retracted so that the latch 35 holds the lever 34 with the follower 40 out of cam contact. The solenoid 43 is arranged to be energized by a common type of overcurrent relay 45 (such as a G.E.–P.J.C. relay), the leads 46 being shown schematically leading from the screw shaft motor 24 to the relay 45 and solenoid 43. The relay contacts 47 are shown open as under normal torque drive conditions. However, when the packing pressure on the material in the space 25 requires an overcurrent to drive the motor then the relay contacts 47 are closed to energize the solenoid 43 whereupon the latch 35 is withdrawn from the path of the lever 34 and the latter permits the follower roller 40 to ride to the low side of the cam under the outward pressure of the compacting material. Now the material is momentarily free to expand and open its structure, for forward and discharge movement.

Referring to FIG. 4, one form of mechanical control for the section 26 is schematically shown with such controlled parts as are common to FIG. 3 being identified by the same reference numerals to avoid confusion. In this instance, however, the latch 35 is hinged about a horizontal axis fixed pivot to form an upstanding leg 52 at one end as an actuating member and has the latching offset 37 at the other end. The leg 52 is apertured for the free passage of a push rod 53 which is pivotally connected to a bolt 54 projecting from the speed reduction housing 55. Preferably the reduction unit is that commercially known as "Shaft-King." The other end of the push rod 53 has two spaced apart discs 56 and 57 fixed thereon, the disc 56 being at one side of the leg 52 and the disc 57 being at the opposite side of the leg 52. Between the disc 56 and the leg 52 there is a compression spring 58 and between the disc 57 and the leg 52 there is a compression spring 60. The projecting end of the rod 53 has a threaded nut 59 for spring adjustment. Thus flexing pressure from opposite sides of the leg 52 maintains it in a floating relation to the push rod 53 so that unwanted movements or vibrations are compensated without disturbing the latch 35 under normal conditions.

In order to compensate for torque overload reaction upon the housing, a torque arm 61 is connected at one end to the bolt 54 to be slidably supported by a fixed bracket 62 while its free projecting end carries a compression spring 63 held under a predetermined resisting pressure by a follower 64 and an adjusting nut 65 threaded upon the end of the arm 61. When such overload condition occurs, the counter-clockwise torque reaction of the housing 55 overcomes the set resistance of the spring 63 to transmit motion by the bolt 54 to the push rod 53 which thereupon rocks the leg 52 to lift the latch 35. When this happens, the lever 34 comes under control of the cam 38 to withdraw the cylinder section 26, thereby relieving the packing pressure and restoring the torque arm 61 by spring 63 to reset the latch 35 and hold back the lever 34 until another overload occurs.

Referring to FIG. 6, a form of the invention is shown wherein the control is responsive to an overload caused by the packing of the material due to frictional contact with the wall of a bore of uniform diameter. In this form the movable section 26 is normally held coincident with the cylinder length to leave the outlet area unrestricted. As in the other forms of control, the arm 32 normally holds the section 26 as a continuous part of the cylinder wall but hinged to move outwardly when the arm 32 is moved away by the control in response to an overload pressure upon the packed material. The opening of the section 26 increases the discharge area of the cylinder to thereby relieve the internal frictional resistance and so free the packed material for free discharge. Obviously, either the electrical or the mechanical control is useable with this form of the invention.

The operation of the novel control can be generally described as follows: Initially the hinged section 26 is held by the arm 32 in an inclined position to form either a converging tapered passage or one of uniform diameter as an area in the length of the fed material to build up a maximum squeezing pressure which extracts any remaining material, contaminated water or other liquid. When the density of the part of the material in the restricted zone reaches the point where an overloading of the motor is necessary, the pressure response control acts to remove the latch 35 from the lever 34. As soon as this takes place, the lever 34 is free to ride to the low side of the cam 38 under the outward pressure of the packed material operating through the outwardly moving section 26 against the arm 32. Thus the cam movement and coordinating packing pressure alternately decompresses and compresses the material in the packing area. The reciprocation of the section 26 may be momentary on the order of one second or several seconds until the driving torque returns to normal, at which time the torque control shifts the latch 35 to holding position, whereupon the section 26 is held in passage restricting position until the compacting of the material causes another overload.

When the control is electrical, an overload causes the over-current relay 45 to be energized to close the circuit for the solenoid 43 to thereby withdraw the latch 35 from the lever 34. Thus the lever 34 is free to reciprocate through the medium of the cam 38 and the built-up pressure of the compacting material.

When the control is mechanical, an overload upon the speed reducing unit is transmitted by the housing bolt 54 to permit the torque arm 61 to withdraw the latch 35 and release the held lever 34 so that the section 26 is free to reciprocate and relieve the abnormal packing pressure momentarily or at such time as the overload occurs again.

In order to initiate the breaking up of the material as it discharges from the extractor, a cutter blade 66 is attached to the shaft 22 to rotate therewith in a plane transverse to the extruded material and in close proximity to the cylinder outlet.

It will now be apparent that a complete unitary apparatus for feeding or extruding water-laden material from a tube wherein the heretofore dense and damaging packing of the material during its travel has been overcome by the control of the invention.

Further the novel control means is responsive to variations of the density of the fed or extruded material so that resistance built up by abnormal density is self-compensated in order to prevent damaging overload to the driving motor. Also the control functions intermittently to restore normal density conditions and so maintain a substantially constant feeding pressure.

While the control is shown as a part of a tube having a conventional screw conveyor, this is only one operative assembly and therefore not a limitation of the invention because the control can equally well function as a part of a tube having a reciprocable plunger type of conveyor for extrusion purposes.

Having now described my invention I claim:

1. A material feeding unit comprising a perforated tube having an inlet at one end thereof, an outlet at the other end thereof, the side wall of the tube having an opening therein adjacent said outlet, a freely movable arcuate section hinged to said tube adjacent to said side wall opening and extending longitudinally of the tube so as to cover said opening, movable means holding said section in closed position to resist expansion of the material being fed through the tube, power means for feeding saturated elastic material through said tube, means to release said movable section holding means under abnormal radial expansion of said material, and means to move said holding means in a timed cycle when the holding means is released, whereby said section opens and closes said wall opening.

2. A material feeding unit, according to claim 1 wherein said power means includes an electric motor and said means to move said holding means in a timed cycle includes an overcurrent relay.

3. A material feeding unit, according to claim 1, wherein said power means includes an overload torque rod.

4. A material feeding unit, comprising a tube having an inlet and an outlet, the side wall of the tube having an opening adjacent said outlet, a freely movable hinged section on said tube adjacent said side wall opening and extending longitudinally of the tube so as to cover said opening, for varying the discharge area of said tube, power means feeding said material through said tube, a lever system for holding said section in a closed position to resist expansion of the material while feeding said material, a latch maintaining said system in holding position, means operated by overload packing pressure to release said latch, and means to open and close said section in a definite cycle when said latch is released.

5. A material feeding unit according to claim 4 wherein said means to open and close said section includes a cam operated by said power means.

6. A material feeding unit, comprising a tube having an inlet at one end and an outlet at the other end thereof, the side wall of the tube having an opening therein adjacent said outlet, means for feeding saturated elastic material through said tube, a freely movable hinged section on said tube adjacent said side wall opening and being outwardly movable under expansion of the material by feeding pressure to an open position, means including a latch holding said section in a closed position to resist normal material expansion, said feeding means including a power driven shaft including a speed reducing unit, a housing for said reducing unit, a torque rod connected to said housing, and means between said rod and said latch responsive to reacting torque on said rod to release said latch, whereby said section is moved to said open position.

7. A material feeding unit according to claim 6 wherein said latch releasing means includes a push rod and floating spring connection means.

References Cited in the file of this patent

UNITED STATES PATENTS

| 430,456 | Wright | June 17, 1890 |
| 2,178,714 | Anderson | Nov. 7, 1939 |
| 2,478,012 | Raney | Aug. 2, 1949 |
| 2,600,827 | Almquist | June 17, 1952 |
| 2,763,201 | Hauswirth | Sept. 18, 1956 |

FOREIGN PATENTS

| 1,029,103 | France | Mar. 4, 1953 |
| 1,078,231 | France | May 5, 1954 |
| 1,234,427 | France | May 16, 1960 |